June 21, 1966 J. E. SADLER 3,256,682

COTTON PICKER DOFFER

Filed Oct. 31, 1963

INVENTOR.
James E. Sadler
BY
John J. Kowalik
Atty.

United States Patent Office 3,256,682
Patented June 21, 1966

3,256,682
COTTON PICKER DOFFER
James E. Sadler, Memphis, Tenn., assignor to International Harvester Company, Chicago, Ill., a corporation of New Jersey
Filed Oct. 31, 1963, Ser. No. 320,421
6 Claims. (Cl. 56—41)

This invention relates to cotton pickers and more specifically to a novel doffer therefor.

Heretofore doffers have been constructed with a relatively rigid plate to which there is mounted a rubber or elastomer doffing pad with a series of doffing lugs thereon. This construction is relatively expensive and the flexibility characteristics of the doffer are restricted to its peripheral edges.

A general object of the invention is to provide a novel, simple and efficient doffer which is constituted essentially of elastomer material such as flexible natural or synthetic rubber and the like and wherein certain parts of the doffer, namely, its web portion is reinforced with a webbing of wire mesh strategically located to provide rigidity in the web without unduly restricting its flexible characteristics.

A further object of the invention is to provide a novel doffer which comprises a metallic hub center portion to which is molded a disk of elastomer material which has a matrix of wire mesh providing rigidity in the central portion of the disk, the peripheral portions of the disk being of elastomer material which are integrally united with doffer lugs which have inner end portions in vertical registry with the wire mesh and outer end portions in registry with the peripheral portions of the disk whereby the flexibility of the outer ends of the doffing lugs is enhanced and the inner end portions is restricted to provide a gauge for setting the doffers on the spindles.

A still further object of the invention is to provide a novel doffer disk wherein the disk is of molded elastomer material such as rubber or synthetic rubber or the like and wherein the disk is provided with a plurality of radially outwardly extending ribs on its lower side, these ribs having inner end portions integrally united with a sleeve of elastomer material which is bonded to the metal hub of the doffer and the ribs terminating adjacent to the outer periphery of the disk, the outer periphery of the disk being formed with a ring of elastomer material on which there are supported a plurality of doffing means in the form of lugs integrally united with the ring.

These and other objects and advantages inherent in and encompassed by the invention will become more readily apparent from the specification and the drawings, wherein.

Figure 5:
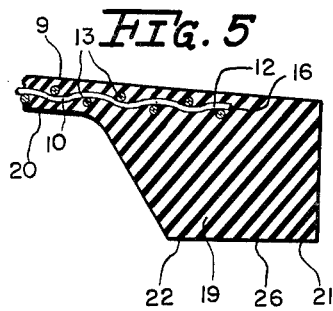
Figure 4:
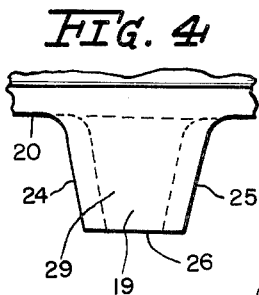
FIGURE 4 is a fragmentary edge view of the doffer.
Figure 3:
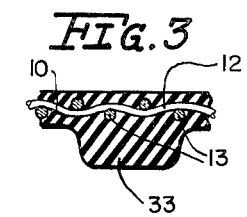
FIGURE 3 is a fragmentary sectional view taken substantially on the line 3—3 of FIGURE 1.

FIGURE 5 discloses a sectional view, on an enlarged scale, of a doffer lug with a portion of the supporting disc showing the reinforcing means.

Describing the invention in detail there is shown a doffer generally designated 2 which comprises a center hub portion 3 which is a metallic tubular or cylindrical sleeve member having upper and lower end portions 4 and 5 and an outer peripheral surface 6 about which there is formed, by molding, a sleeve 7 of elastomer material, the sleeve 7 being bonded to the surface 6 and providing a connection to a radially outwardly extending web or disk portion 9 which is formed of elastomer material, said disk portion 9 being integrated with the sleeve 6 adjacent to the upper end 4 of the hub 3.

The web portion 9 has a shore hardness of between 60 and 70 durometer and has a matrix designated 10 which is formed of number 6 mesh wire cloth, the wires being substantially .063" in diameter and comprising wires 12 which extend generally radially of the plate or web portion 9 which may be termed weft wires and the warp wires 13 which extend generally circumferentially of the disk.

The wires 12 and 13 are woven over and under each other as well known to those skilled in the art in making screens and are embedded within the plate portion 6. The wire mesh extends from the radially inner extremity 15 of the disk to an outer edge portion 16 which projects approximately half way into the ring or annulus 17 which constitutes the outer peripheral edge portion of the disk. Thus, it will been seen that the disk has an inner portion 18 and a radially outer portion 17' and that the inner portion 18 has greater rigidity than the outer portion 17' to transverse deflection as well as to deformation and circumferential deflection due to torque being applied to the doffer lugs 19 which are equally spaced about the outer periphery of the plate 10 and project axially from the bottom side 20 of the plate portion 9.

Figure 1:
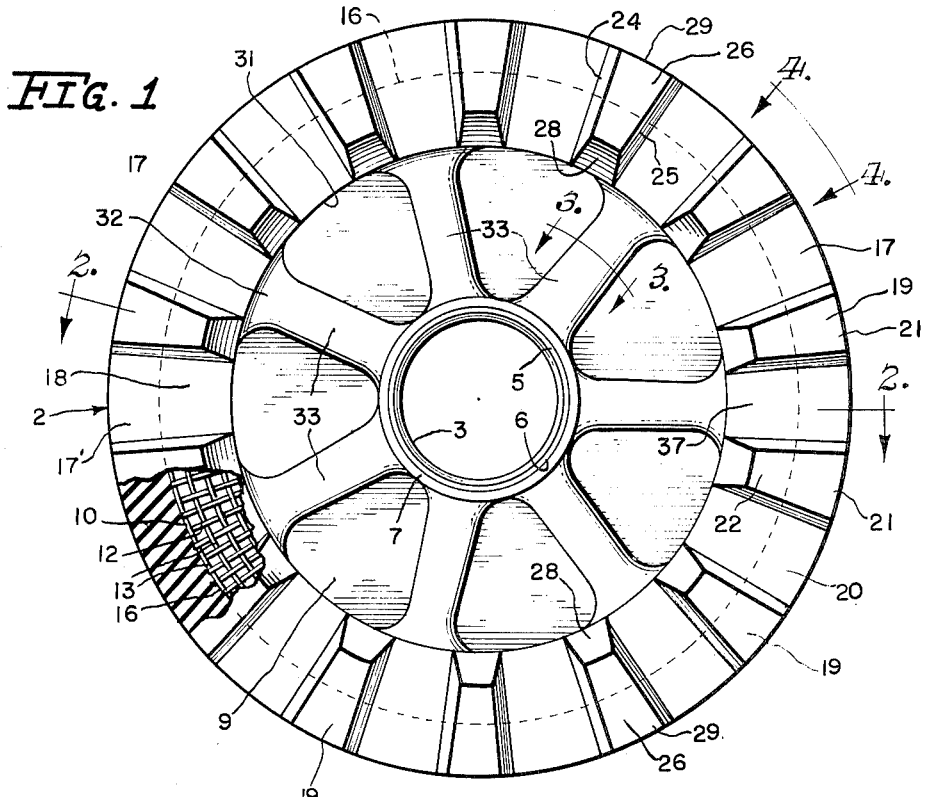
FIGURE 1 is a bottom plan view of a doffer made in accordance with the present invention.
Figure 2:
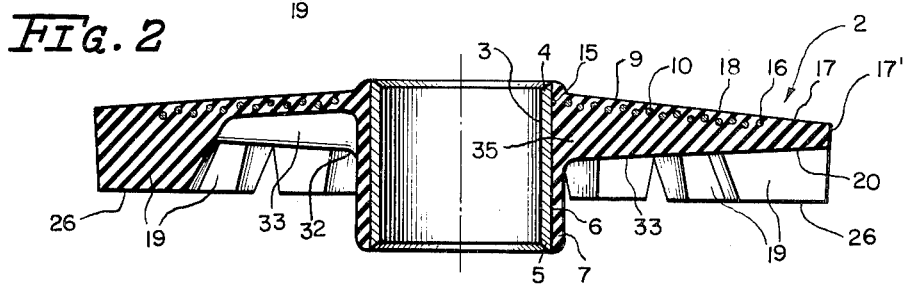
FIGURE 2 is a radial sectional view taken substantially on the line 2—2 of FIGURE 1.

It will be seen that each lug comprises an outer end portion 21 and an inner end portion 22 and that the outer end portion is in vertical alignment or axial alignment with the portion 17' and that the inner end portion 22 of each lug 19 is in vertical alignment with the contiguous portions of the wire mesh webbing 10. Thus, the lug 19 is inherently more flexible along the outer periphery of the plate than inwardly thereof. It will be also seen that each lug has axial sides 24 and 25 and that at these sides it tapers in a direction axially outwardly or downwardly of the bottom side 20 of the plate and provides a bottom doffing surface 26 which is adapted to engage with an associated spindle as well known to those skilled in the art. Each lug 19 also tapers radially inwardly as best seen in FIGURE 1 wherein it will be noted that the inner end 28 is narrower circumferentially than the outer end 29 of each lug. It will be seen that the lugs 19 are arranged in a regular circular pattern the ring 17, and the upper ends are integrally united with the ring or annulus 17 which is thicker than the web portion 9. The inner edge 31 of this ring 17 is disposed inwardly of the outer peripheral edge 16 of the wire mesh matrix and provides an area of merger for the outer ends 32 of radially disposed ribs 33 which are also formed of the same elastomer material as the web and the lugs and the portions 17 and 30. The webs or ribs 33 as seen in FIGURE 2 are broader at their radially inner base ends 35 wherein they merge into the sleeve 7 than wherein they merge into the inner edge 31 of the ring 30. The width of the ribs 33 is somewhat less than the spacing designated at 37 between adjacent lugs 19 and there is a rib in alignment with each alternate space 37 between the lugs. Thus the flexibility of each lug 19 is substantially the same. It will also be seen that the lugs 19 are spaced from the wire mesh matrix 9 by an extra thickness of the elastomer or rubber material so that they may float universally which is not inhibited by the resistance of the wire mesh.

It will be observed that the wire matrix thus serves to stabilize the structure of the disk portion without making it so rigid that it will not deflect away from excessive bunchings of material which may be carried by the spindles. The wire mesh which is made of spring steel wire gives the plate sufficient body to prevent the plate from distorting due to centrifugal action and to provide sufficient resistance to reactive engagement with the cotton to be able to doff the cotton clean from the spindles.

Having described the preferred form of the invention, it will be understood that various other designs will become readily available to those skilled in the art within the purview of the appended claim.

What is claimed is:

1. A doffer comprising a metallic hub, a substantially flat, flexible web about the hub extending radially therefrom and connected with said hub for rotation therewith about a defined axis, said web being made of flexible rubber or the like and having a matrix of steel wire mesh, and doffer lugs integral with said web, said web having an annular peripheral portion outwardly of said mesh, and said lugs elongated radially of the doffer and having inner end portions in axial alignment with portions of said mesh and having outer end portions in alignment with said annular peripheral portion of the web.

2. A doffer assembly comprising a hub, an annular molded disk of flexible rubber or the like about the hub, a flexible steel wire mesh reinforcement molded to the disk and providing strength and support therefor between said hub and the outer periphery of the disk, said disk having an integral outer peripheral annulus thicker than the disks, said annulus having an unsupported portion disposed outwardly of the wire mesh, and doffing lugs integral with said annulus and having inner end portions in axial alignment with said mesh and outer end portions in axial alignment with said unsupported portion of the annulus.

3. A doffer assembly comprising a hub, an annular molded disk of flexible elastomer material connected with the hub, a reinforcing metallic matrix within said disk terminating inwardly of the outer periphery of the disk, radially elongated ribs of said material integrally united with one side of the disk and tapering from the hub toward the outer periphery of the disk, and doffing lug means of said material integral with the disk and projecting axially from said one side of the disk.

4. The invention according to claim 3 and said lug means being disposed on sectors of said disk between said ribs.

5. The invention according to claim 4 and said lug means having inner end portions underlapping said matrix and outer end portions outwardly of the matrix.

6. The invention according to claim 5 and said lug means being circumferentially widest about the outer periphery of the doffer and tapering radially inwardly toward the hub.

References Cited by the Examiner

UNITED STATES PATENTS 3,151,432  10/1964  Sadler _____ 56—41

ABRAHAM G. STONE, *Primary Examiner.*

RUSSEL R. KINSEY, *Examiner.*